Feb. 21, 1967  C. F. WALDRON  3,305,718
SWITCH CONTROL SYSTEM FOR PERMANENT MAGNET
MOTORS AND THE LIKE
Filed Sept. 19, 1963  2 Sheets-Sheet 1

INVENTOR.
CLAUDE F. WALDRON
BY *Howson & Howson*
ATTYS.

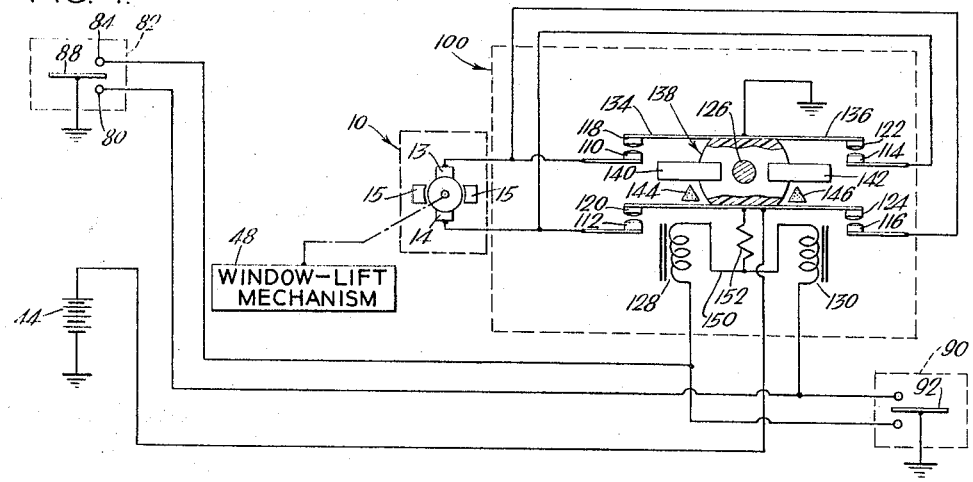
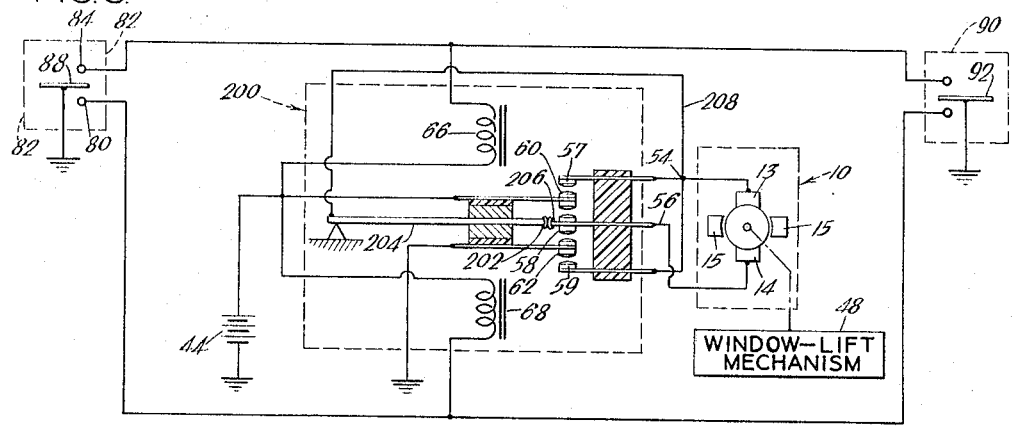
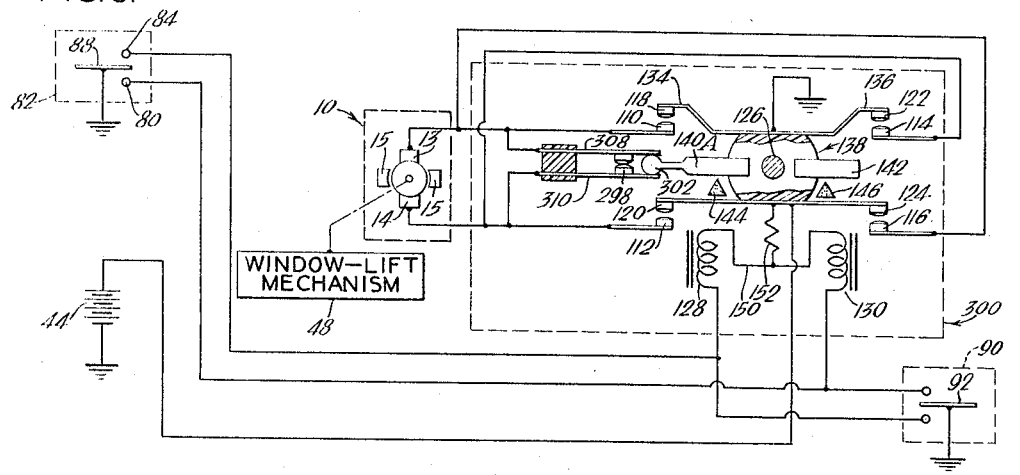

United States Patent Office 3,305,718
Patented Feb. 21, 1967

3,305,718
SWITCH CONTROL SYSTEM FOR PERMANENT
MAGNET MOTORS AND THE LIKE
Claude F. Waldron, Columbus, Miss., assignor to American Bosch Arma Corporation, Columbus, Miss., a corporation of New York
Filed Sept. 19, 1963, Ser. No. 310,037
1 Claim. (Cl. 318—261)

This invention relates to systems for controlling the direction of current through a load device such as the armature of a motor, and especially to apparatus for controlling one or more window-actuating motors from a plurality of locations in a vehicle containing windows capable of being opened and closed.

One important situation in which it is important to control the direction of current through a load device arises in systems for controlling the raising and lowering of vehicle windows by motors of the permanent-magnet field type. In the past it has been common to use motors having field windings to raise and lower the windows in a vehicle, in which case reversal of current in the field windings will reverse the direction of motor rotation and permit raising or lowering of the windows at will. Using the latter type of motor, actuation of a given window could be provided from two positions in the vehicle, such as the operator's position and the position adjacent the controlled window, by controlling the current in one field winding from one position and the current in another field winding from the other controlled position. However, the practicality and low cost of motors using permanent-magnetic fields have made the latter type of motors especially desirable for use in systems for electrically actuating vehicle windows. Since in such permanent-magnetic field motors there is no field winding available, the most practical way to control the direction of motor rotation in order to effect controlled raising or lowering of a window is by controlled reversal of the direction of current in the motor armature. While a simple manual reversing switch connected between the current source and the armature will provide armature current reversal, where it is desired to provide control of window actuation from more than one position in the vehicle the expedient of using one such reversing switch at each control location and connecting the switches in parallel with each other has the serious drawback that if two of the switches are operated contemporaneously in opposite directions then a very heavy load, typically a direct short-circuit, is produced on the source of armature current during such contemporaneous operation. Such an excessively heavy current load is undesirable because of the sever drain which it produces on the current source, and because of the harmful and possibly dangerously high current which then flows through the interconnecting wiring and contacts.

Accordingly an object of the invention is to provide a new and useful system for controlling the reversal of current through a load device.

Another object is to provide such a system in which separate means for controlling said current reversal are provided at two different locations.

Another object is to provide a new and useful remote control system for a bi-directional motor, particularly a motor having a permanent-magnetic field.

A further object is to provide such a control system in which the current through the armature of the motor is separately reversible in either direction from either of two locations, without producing an undue current load on the source of supply current for the armature.

Another object is to provide the latter type of control system in which the current through the armature may also be controlled to a zero value at either of said two locations.

Another object is to provide a control system especially adapted for motor vehicle window actuators.

Still another object is to provide a system for controlling the direction of rotation of a motor separately from two controls at two different locations, in which system contemporaneous operation of the two controls oppositely, so that they tend to produce opposite directions of motor rotation, results in actuation of the window by the first-operated control so long as the first-operated control is continuously operated.

A further object is to provide a relay switch arrangement suitable for use in such a system which resists the tendency to be actuated unintentionally by mechanical shock.

Yet another object is to provide such a system and a relay arrangement therefor which provides dynamic braking of a controlled motor to minimize coasting of the motor when power to it is cut off.

In accordance with the invention the above objects are achieved by the provision of a system in which a load device, such as the armature of a permanent-magnetic field motor, is supplied with operating current from the output terminals of a relay having at least two positions, in one of which positions said output terminals are supplied with a voltage of a first polarity and in the other of which positions the output terminals are supplied with a voltage of the reverse polarity, so that the two opposite positions of the relay produce opposite directions of current in the load device and hence opposite directions of rotation of a motor whose armature is used as a load device; preferably the relay has a third position in which no voltage is applied to the load device. To operate the relay between its different positions a pair of conductive, resistive, control elements such as control coils are used, current through but one of the control elements serving to actuate the relay to one of its voltage-supplying positions and current through only the other control element actuating the relay to its opposite voltage-supplying position. Preferably the relay has a normal position which it assumes in the absence of current through either of the control elements and in which no output voltage is supplied to the output terminals; in a preferred form the motor armature is automatically short circuited when the relay is in its normal, de-actuated position. One end of one of the control elements is conductively connected to one end of the other control elements, and an actuating potential is applied to the latter interconnection. A control switch is connected between the other ends of the two control elements to permit connection at will of either coil to a terminal maintained at a reference potential differing from said actuating potential, thereby to pass a relay-actuating current through one or the other of the control elements or through neither of them depending upon the position of the control switch. One or more other switches may be connected in parallel with the above-mentioned control switch and disposed at various locations, so that operation of any one of the switches will provide the desired current in either direction through the load device, or no current at all therein. Contemporaneous operation of more than one of the control switches in the same direction does not alter the desired control action which would be obtained by operation of one of them alone, while operation of any two of the switches in opposite directions to each other does not produce an unduly heavy load on the source of operating potential because the resistance of one of the control elements is always included in series in the closed circuit thus formed.

The relay used is preferably of a form to provide no voltage between its output terminals in its normal, or non-actuated, position and to be incapable of actuation from one of its two voltage-supplying positions to the other of its voltage-supplying positions so long as the control switch which placed the relay in said one position continues to be operated. This operation will be provided, for example, by a relay having a movable contacting element which is moved in opposite directions by two opposed magnetic control elements, so that when the relay is actuated to one of its voltage-supplying positions the movable element comes under the dominant control of the corresponding magnetic control element, while the other magnetic control element is relatively ineffective because of the position of the movable element. As a further feature positive means, such as a resilient stop, may be included in the relay to prevent unintentional closing of the relay contacts in response to mechanical shock, while permitting closure in response to the relay-actuating currents.

In a principal application of the invention to window actuation in vehicles, the controlled window-actuating motors are ordinarily located one at each of the windows to be opened and closed, one set of control switches for all of the windows is located on a common control panel convenient to the vehicle operator, and an additional control switch for each window is located in a position adjacent the corresponding window for convenient operation by a passenger, with the exception that the window adjacent the operator is not ordinarily provided with such second switch. Each relay is preferably located adjacent its corresponding motor so that only the relatively weak current required to operate the relays need pass through the relatively long interconnecting leads, although the relays may be located at the control panel if desired. The reference potential employed may be the frame of the vehicle, so that special leads for supplying the reference potential to the various control elements are unnecessary. If desired, a resistive element may be placed in series with the source of supply of actuating potential and one or more of the control coils to permit use of smaller coils and/or larger diameter of wire while still keeping the current through the coils to a minimum.

Other objects and features of the invention will be more readily understood from the consideration of the following detailed description taken in connection with the accompanying drawings, in which:

FIGURES 4, 5 and 6 are schematic representations illustrating alternative forms of the system of the invention.

Figure 1:
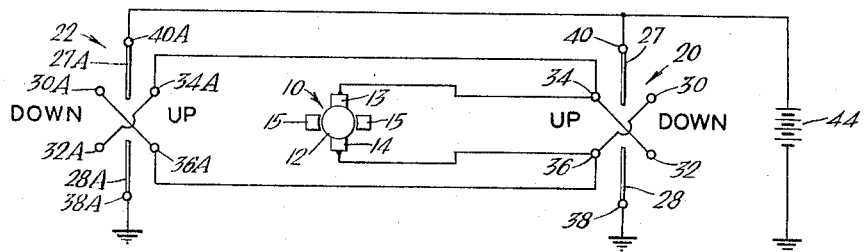
FIGURE 1 is a schematic diagram illustrating a control system derivable from the teaching of the prior art.

Referring now to the schematic diagram of FIGURE 1 illustrating and arrangement in accordance with the prior art, there is shown a D.C. motor 10 comprising an armature 12 through which current is passed in response to voltage differences developed between brushes 13 and 14 thereof, and having permanent magnets 15 providing the motor field. Two similar, conventional, double-pole double-throw, current-reversing switches 20 and 22 are provided. In switch 20 switch arms 27 and 28 are ganged together and may be thrown to the right to engage contacts 30 and 32 respectively, or to the left to engage contacts 34 and 36 respectively. Contacts 30 and 34 are cross-connected to contacts 36 and 32 respectively. Input contact 38 of switch 20 is connected to arm 28 and grounded, while input contact 40 is connected to arm 27 and to the positive terminal of a battery 44, the negative terminal of which is grounded. When switch 20 is in its normal, non-actuated condition as shown, no voltage is applied to the armature of motor 10. When switch arms 27 and 28 are thrown to the right, brush 13 is grounded and brush 14 made positive to operate the motor in a given direction, for example so as to lower a window driven thereby. When switch 20 is thrown to the left, the voltage between the brushes is reversed so the motor reverses and raises the window.

Switch 22 may be identical with switch 20, functionally corresponding parts being designated by corresponding numbers with the letter A appended thereto, and is connected in parallel with switch 20 so that throwing switch 22 to the right operates motor 10 in the direction to raise a window driven thereby and throwing switch 22 to the left operates motor 10 in the direction to lower the window.

If both of switches 20 and 22 are thrown to their "up" position, or to their "down" position, proper operation will still be obtained. However, if one switch such as 20 is turned to its "up" position and the other to the "down" position, the battery 44 will be short-circuited to ground, as may be demonstrated for this case by tracing the path from the positive side of the battery 44 through contacts 40A, 30A, 36A, 36 to ground, and through contacts 40, 34, 34A, 32A to ground; a similar shorting occurs when both switches are reversed. The result is a severe drain on battery 44 and excessively high current through the interconnecting wiring and the contacts of the switches.

Figure 2:
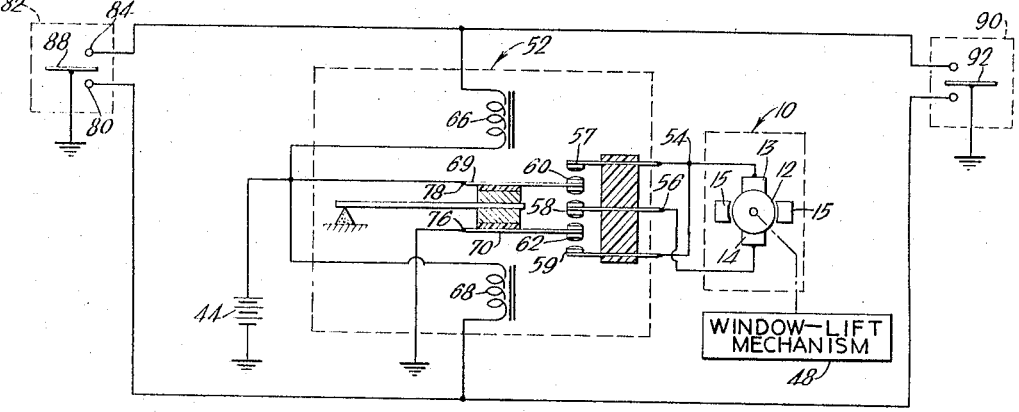
FIGURE 2 is a schematic diagram illustrating one basic form of apparatus in accordance with the invention.

Referring now to FIGURE 2 showing one basic form of the invention, motor 10 may be like that shown in the FIGURE 1, having the armature 12 supplied with armature current from brushes 13 and 14 and having a permanent-magnet field represented as 15. As shown, the motor may be coupled to any appropriate window-lift mechanism 48 so that when the motor 10 rotates in one direction the window is raised and when it rotates in the other direction the window is lowered, the window remaining stationary when the motor is stopped. Also provided is a relay system 52 having output terminals 54 and 56 connected respectively to brushes 13 and 14 of motor 10. In this example the relay 52 also comprises three fixed contacts 57, 58 and 59, contacts 57 and 59 being connected to relay output terminal 54 while the central contact 58 is connected to relay output terminal 56 and insulated from contacts 57 and 59.

Relay 52 also comprises movable contacts 60 and 62 positioned between contacts 57 and 58 and between contacts 58 and 59, respectively. Contacts 60 and 62 are mounted from a common insulating spacer so as to move together. Fixed contacts 57, 58 and 59 are mounted on conductive cantilevered arms as in a conventional stacked-reed type relay, as are contacts 60 and 62. Magnetic control coils 66 and 68 are provided in opposed relation adjacent the support arm 69 for contact 60 and the support arm 70 for contact 62, respectively, so that positive current flowing upwardly through coil 66 produces an upward magnetic attraction causing contacts 60 and 62 to move upwards together and into contact with fixed contacts 57 and 58 respectively, while a positive current flowing downwardly through coil 68 exerts a downward magnetic attraction on arm 70 so as to move both of contacts 60 and 62 downward into contact with fixed contacts 58 and 59 respectively. In the absence of current through the control coils, the movable contacts 60 and 62 are spaced from all of the fixed contacts 57, 58 and 59 as shown.

Input terminal 76 of relay 52 is connected to ground, and input terminal 78 thereof is connected to the positive terminal of battery 44, the other terminal of which battery is grounded. Accordingly, in the position of the relay contacts shown the motor 10 has no current supplied to its armature 12, since no voltage is supplied to the output terminals 54 and 56 of the relay 52 from the input terminals 76 and 78 thereof. However upward current through control coil 66 will connect the positive terminal of battery 44 to contact 57 and thence to output terminal 54, and simultaneously will connect grounded contact 62 to fixed contact 58 and thence to output terminal 56. The result is that in the latter condition the upper brush 13 of motor 10 is positive and the lower brush 14 is grounded, causing the motor to rotate in a predetermined direction so as to actuate the window-lift mechanism 48 in a given direction, for example to raise the window. When the current through the upper control coil 66 ceases the motor rotation also ceases. A downward current through lower control coil 68 causes contact 60 to bear against contact 58 and also causes contact 62 to bear against contact 59, thus grounding output terminal 54 and making output terminal 56 positive with respect to ground, thereby to operate the motor 10 in the direction opposite to that previously described and hence, in this example, to lower the window.

In order to control the application of current to the two control coils 66, 68, the lower end of coil 66 and the upper end of coil 68 are directly connected together and to the positive, ungrounded terminal of the battery 44. The lower end of the lower control coil 68 is directly connected to fixed contact 80 of single-pole, double-throw, normally-open, manual-controllable, switch 82, while the upper end of the upper control coil 66 is directly connected to fixed contact 84 of switch 82. The movable arm 88 of switch 82 is grounded, and may be moved manually and at will into contact with either of contacts 80 and 84 so as to ground either of them.

Grounding of the upper contact 84 by upward motion of arm 88 produces the above-described upward current in control coil 66 which raises the window, while actuation of arm 88 into position against fixed contact 80 grounds the lower end of the lower control coil 68 thereby to produce the above-described downward current therein which produces lowering of the window. Accordingly, control switch 82 in its normal, non-actuated position causes the window to remain stationary; pushing its movable arm 88 upward raises the window so long as the arm continues to be urged upward; and pushing its movable arm downward lowers the window so long as the arm continues to be urged downward.

To provide control of the window-lift mechanism from another control location, another control switch 90 is provided which may be identical with the above-described switch 82 and connected directly in parallel therewith as shown. With switch 82 in its normal, open, position it will be apparent from the foregoing that actuation downward of the manually-movable arm 92 of switch 90 will lower the window and upward actuation of the arm will raise the window. If the movable arms of both control switches 82 and 90 are in the downward position, or if both are in the upward position, the same result is obtained as if only one of them had been so actuated.

It is a feature of the invention that if one of the control switches 82 and 90 is in its "up" position and the other in its "down" position, the battery will not be short-circuited, and the window will move in a direction determined by the position of the switch which was first actuated. Thus if switches 82 and 90 are in opposite positions the upper end of control coil 66 and the lower end of control coil 68 will both be grounded, but the resistance of the relay coils 66 and 68, which is preferably substantial, will remain interposed between ground and the positive side of battery 44 so as to prevent short-circuiting of the battery. In the latter situation, whichever of the control coils was first traversed by actuating current will exert a magnetic attraction on the movable contact assembly of relay 52, pulling the assembly toward it to operate the relay and the window-lift mechanism. Because the movable contact assembly is then closer to the relay coil which actuated it, the other relay coil exerts a much weaker attracting effect and is unable to overcome the attraction caused by the first relay. Accordingly the first control switch to exert an effect on its associated control coil will control the window operation so long as the switch remains in its actuated position.

Figure 3:
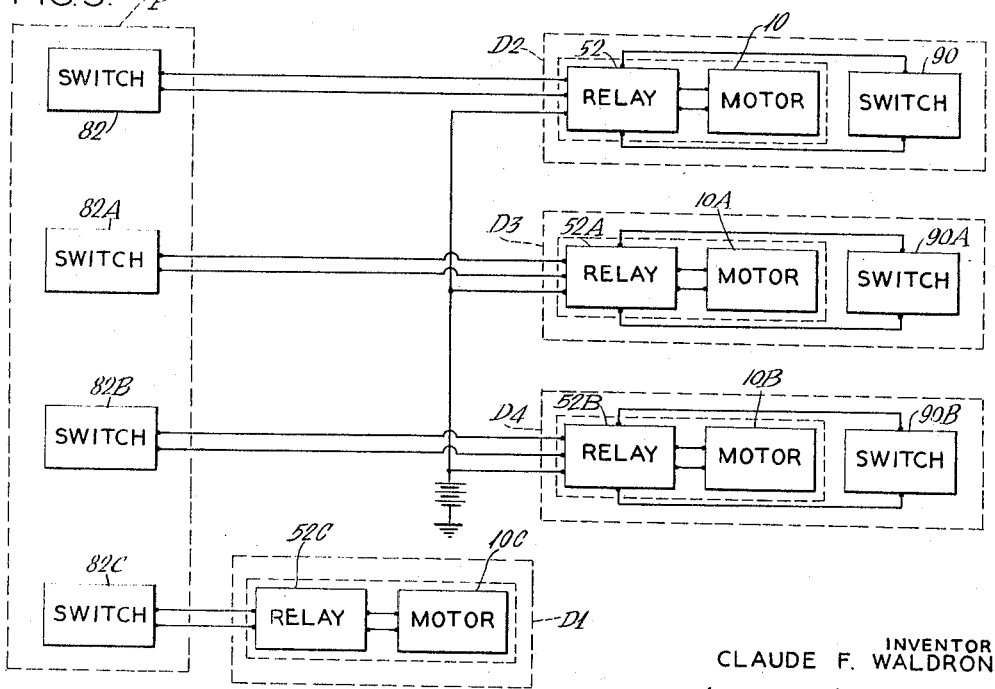
FIGURE 3 is a block diagram illustrating a typical arrangement of the system of the invention as applied to a four-door automobile.

While FIGURE 2 illustrates the electrical interconnections of a basic form of the invention, FIGURE 3 illustrates a perferred and typical physical arrangement of an electrical system of the invention as it would typically be employed in a window-lift control system for a conventional four-door automobile. In FIGURE 3 each of the numbered elements may be substantially identical in form with the correspondingly-numbered elements of FIGURE 2, the suffixed letters being used to indicate the different control systems for the different windows. In this figure the corresponding window-lift mechanisms and windows have not been shown, but it will be understood that a different window-lift mechanism and window is operated by each of the different motors shown therein.

More particularly, in FIGURE 3 P represents a control panel normally positioned at a convenient location adjacent the operator of the vehicle, in which are contained window-actuation control switches 82, 82A, 82B and 82C, each for operating a different window associated with one of the four different doors of the vehicle. D1 represents the door immediately adjacent the position normally occupied by the vehicle operator, in which door are located a relay 52C of the type described above as element 52 of FIGURE 2, as well as the permanent magnetic field motor 10C; no additional control switch is shown in this instance because the operator can readily operate the mechanism from the control panel P. D2 represents another door of the vehicle, in this case containing the relay 52, the motor 10 and the alternate control switch 90 so that the motor 10 may be controlled either by the switch 82 at the control panel or by the passenger-control switch 90 situated on the door containing the window to be operated. The remainder of FIGURE 3 shows the same arrangement for additional doors D3 and D4, the window-lifting motors of which can be actuated either by the control switches on panel P or by the alternate control switches located at the corresponding doors.

With the arrangement shown in FIGURE 3, the relatively long leads running from the control panel P to the relays at the several doors need carry only the relatively small current required to operate the relays, rather than the larger currents required to operate the motor. Preferably the relays in this and other forms of the invention are located inside the corresponding motor housings themselves. However, if desired, any or all of the relays 52, 52A, 52B and 52C can be located in the control panel P, or elsewhere.

FIGURE 4 shows an alternative form of relay arrangement which may be used in place of relay 52 of FIGURES 2 and 3, and appropriate connections for operation in accordance with the invention. Elements corresponding to those of FIGURE 2 are designated by the same numerals. In this case the relay 100 is a toggle-type magnetically-operated relay with provision for preventing it from being jarred closed when an automobile door containing it is closed. In the example shown the relay comprises four fixed contacts 110, 112, 114, and 116 and an asesmbly of pivotably-mounted movable contacts 118, 120, 122, and 124 arranged to be pivoted together about an axis 126 in response to currents through either one of the two control coils 128 and 130. The upper pair of movable contacts 118 and 122 are electrically and mechanically connected together by their supporting arms 134 and 136 respectively, which extend symmetrically about a line perpendicular to the axis of pivot and are grounded. Movable contacts 120 and 124 are electrically and mechanically connected together and to the positive terminal of battery 44. Rotatable support 138 supports the contact arms, and insulates the top pair of arms from the bottom pair, and is provided with a pair of opposed outwardly-extending ears 140 and 142. In this example the ears 140 and 142 comprise the parts of the relay magnetically attracted by the control coils 128 and 130, and fixed resilient stops 144 and 146 are positioned adjacent ears 140 and 142 respectively in a position ot prevent turning of the ears sufficiently to close the relay contacts in response to mechanical shock caused by closing of the door containing the relay. However, the stops are sufficiently resilient to permit the contacts to be drawn to their closed positions by the control coils.

In the FIGURE 4 embodiment the interconnection 150 of the relay control coils is supplied with positive potential from the battery by way of a resistor 152, which permits use of lower-resistance control coils without unduly loading the battery.

Brushes 13 and 14 of motor armature 12 are connected to fixed contacts 110 and 112 respectively, as well as to fixed contacts 116 and 114 respectively, so as to produce a positive voltage at brush 13 with respect to brush 14 when the switch support 140 is rotated clockwise by relay coil 130, and an opposite voltage when switch support 138 is rotated counter-clockwise by relay coil 128. Control switches 82 and 90 again provide manually-controlled grounding of the lower end of either of coils 128 or 130 from two different locations, so as to turn the motor in either direction to actuate the window-life mechanism in either desired direction. Again, if the control switches 82 and 90 are operated in opposite directions the battery is not unduly loaded.

FIGURE 5 shows another type of relay arrangement 200 connected in a control circuit like that of FIGURE 2, for similar control purposes, but differing in that dynamic braking is provided to inhibit coasting of the motor after it is turned off. This action is provided by adding to the relay of FIGURE 2 a center contact 202 and conductive supporting arm 204 on the movable contact assembly, and modifying the center fixed contact 206 to provide connection to contact 202 only when the relay is in its normal, de-actuated position; a connecting lead 208 is also added from arm 204 to relay output terminal 54, so that contacts 202 and 206, when closed, provide a short-circuit between the brushes 13 and 14 to produce dynamic braking. Whenever the relay is actuated contacts 202 and 206 open and break the short-circuit to permit the previously-described operation. The other elements of the system may be identical with those in FIGURE 2.

FIGURE 6 shows a modification of the arrangement of FIGURE 4 to provide dynamic braking. In this case a pair of normally-closed contacts 298 are provided in relay 300 and connected across the motor brushes 13 and 14 normally to short-circuit them and to provide dynamic braking. Ear 140A is modified from the form 140 of FIGURE 4 to include a protruding actuating member which in the normal, de-actuated position of the relay fits between the conductive supporting arms 308 and 310 for contacts 298, leaving them closed. However, when the relay is actuated to either of its up and down positions, member 302 acts on arm 308, or 310, causing the short-circuiting contacts 298 to open and permit normal operation. Other elements of FIGURE 6 may be identical with those of FIGURE 4.

While the invention has been described with particular reference to specific embodiments thereof, it is susceptible to embodiment in a variety of diverse forms without departing from the scope and spirit of the invention as defined by the appended claim.

I claim:
A reversible motor system, comprising:
electrically-controllable voltage-reversing switch means having a pair of voltage input terminals, a pair of voltage output terminals, first and second conductive control elements each of substantial electrical impedance, and an electrical interconnection between one end of said first control element and one end of said second control element, said first control element being responsive to current flowing through it to connect said pair of input terminals to said pair of output terminals respectively in a given order, said second control element being responsive to current flowing through it to connect said pair of input terminals to said pair of output terminals respectively in an order opposite to said given order, said voltage-reversing switch means having a non-actuated position for which at least one of said voltage input terminals is disconnected from said voltage output terminals;
means for supplying an input voltage between said input terminals;
means for applying a control potential to said interconnection;
a source of a potential differing from said control potential;
a plurality of separately operable switches each having at least two switch positions, and each connected to supply said different potential to the other end of said first element in one of its switch positions and to the other end of said second element in another of its switch positions, thereby controllably to provide at said output terminals a voltage of either polarity for permitting reversal of current through a motor armature connected thereto;
a motor having its armature current supplied from said output terminals;
said voltage-reversing switch means comprising a pair of normally-closed contacts and means connecting said normally-closed contacts directly between said output terminals when said voltage-reversing switch means is in said normal non-actuated posiiton, thereby to produce dynamic braking of said motor when said voltage-reversing switch means is non-actuated.

References Cited by the Examiner

UNITED STATES PATENTS

| | | | |
|---|---|---|---|
| 1,868,691 | 7/1932 | Brown | 317—157 |
| 2,293,968 | 8/1942 | Chandler et al. | 200—98 |
| 2,356,828 | 8/1944 | Crane et al. | 318—293 |
| 2,755,423 | 7/1956 | Hager | 318—261 |
| 2,844,683 | 7/1958 | Maciszewski et al. | 200—166 X |
| 3,042,773 | 7/1962 | Keller et al. | 317—197 X |
| 3,064,172 | 11/1962 | Young et al. | 318—293 |
| 3,222,584 | 12/1965 | Du Rocher | 318—293 |

ORIS L. RADER, *Primary Examiner.*

B. DOBECK, *Assistant Examiner.*